United States Patent [19]

Kaufholz, Jr.

[11] 4,005,492
[45] Jan. 25, 1977

[54] TRANSDUCER HEAD POSITIONING APPARATUS

[75] Inventor: Frank H. Kaufholz, Jr., Havertown, Pa.

[73] Assignee: Computer Peripherals, Inc., Rochester, Mich.

[22] Filed: Aug. 21, 1975

[21] Appl. No.: 606,636

[52] U.S. Cl. .............................................. 360/105
[51] Int. Cl.² ..................... G11B 5/54; G11B 21/22
[58] Field of Search ............................. 360/105, 75

[56] References Cited

UNITED STATES PATENTS

| | | | |
|---|---|---|---|
| 3,404,223 | 10/1968 | Violette | 360/105 |
| 3,668,666 | 6/1972 | Heffernan et al. | 360/105 |
| 3,706,861 | 12/1972 | Giel | 360/105 |

*Primary Examiner*—Robert S. Tupper
*Attorney, Agent, or Firm*—J. T. Cavender; Wilbert Hawk, Jr.; Richard W. Lavin

[57] ABSTRACT

There is disclosed a cassette/cartridge type tape transport assembly for use in digital memory systems which includes a flexure member which supports a transducer head for movement into and out of operative engagement with a magnetic tape. The flexure member is in the form of a one-piece pantograph composed of plastic material which is secured at one end, the free end of the flexure member supporting the transducer head and being deflected by an actuating member to move the transducer head into engagement with the magnetic tape. The free end of the flexure member will flex during this engaging movement to orientate the transducer head in a direction perpendicular to the magnetic tape throughout the movement. A self-aligning pinch roller is also mounted on the flexure member in addition to a tape guide and an end of tape sensor member.

25 Claims, 4 Drawing Figures

TRANSDUCER HEAD POSITIONING APPARATUS

BACKGROUND OF THE INVENTION

Field of the Invention

In the field of data recording utilizing record mediums, such as magnetic tapes, it is conventional practice to support transducer heads on pivoted or sliding mechanical support members which are actuated to move the transducer head into and out of operative engagement with the magnetic tape. In digital application of high track density recording, each transducer head may be provided with a plurality of reading gaps which are required to be precisely aligned with corresponding channels or tracks on the magnetic tape. Using mechanical components for moving the transducer head into and out of engagement with the magnetic tape required that the elements be manufactured to extremely close tolerance and be maintained in precise clearance and alignment in order to provide a high degree of head alignment accuracy over a number of operations which would make the use of said mounting economically feasible. In use, it has been found that even with close tolerances and clearances provided, normal wear of the parts has limited the useful life of transducer head actuating mechanism to the point that the cost in using this type of mechanism is relatively high. It is therefore an object of this invention to provide a transducer head actuating mechanism which is simple in construction and operation and, therefore, low in cost. It is a further object of this invention to provide a transducer head actuating mechanism which repeatedly provides a very high degree of alignment accuracy without the need for precision adjustments to compensate for normal deterioration of clearances between mating elements and alignment of related parts due to wear. It is another object of this invention to provide an actuating mechanism for moving a self-alignment pinch roller into engagement with the magnetic tape which allows for deflection of the tape drive capstan.

SUMMARY OF THE INVENTION

These and other objects of the invention are fulfilled by providing a one-piece transducer head/pinch roller support member for use in magnetic tape recording consisting of a plurality of spaced apart beam-like portions forming a pantographic structure which is secured at one of its ends and which supports a transducer head and a pinch roller at the other free end. The free end of the support member is engaged by an actuating member which, when operated, will move the free end of the support member in a generally linear direction to position the transducer head and the pinch roller into engagement with a magnetic tape. The support structure is composed of a plastic material which allows the beam portions to flex to provide a pantographic movement of the free end when moved by operation of the actuating member. This pantographic movement of the free end will allow the face of the transducer head to remain parallel with the plane of the magnetic tape throughout the movement of the transducer head.

Also mounted on the free end of the support structure is an end of tape/beginning of tape sensor and a tape guide for locating the tape with respect to the face of the transducer head and the pinch roller.

DESCRIPTION OF THE PREFERRED EMBODIMENT

Figure 1:
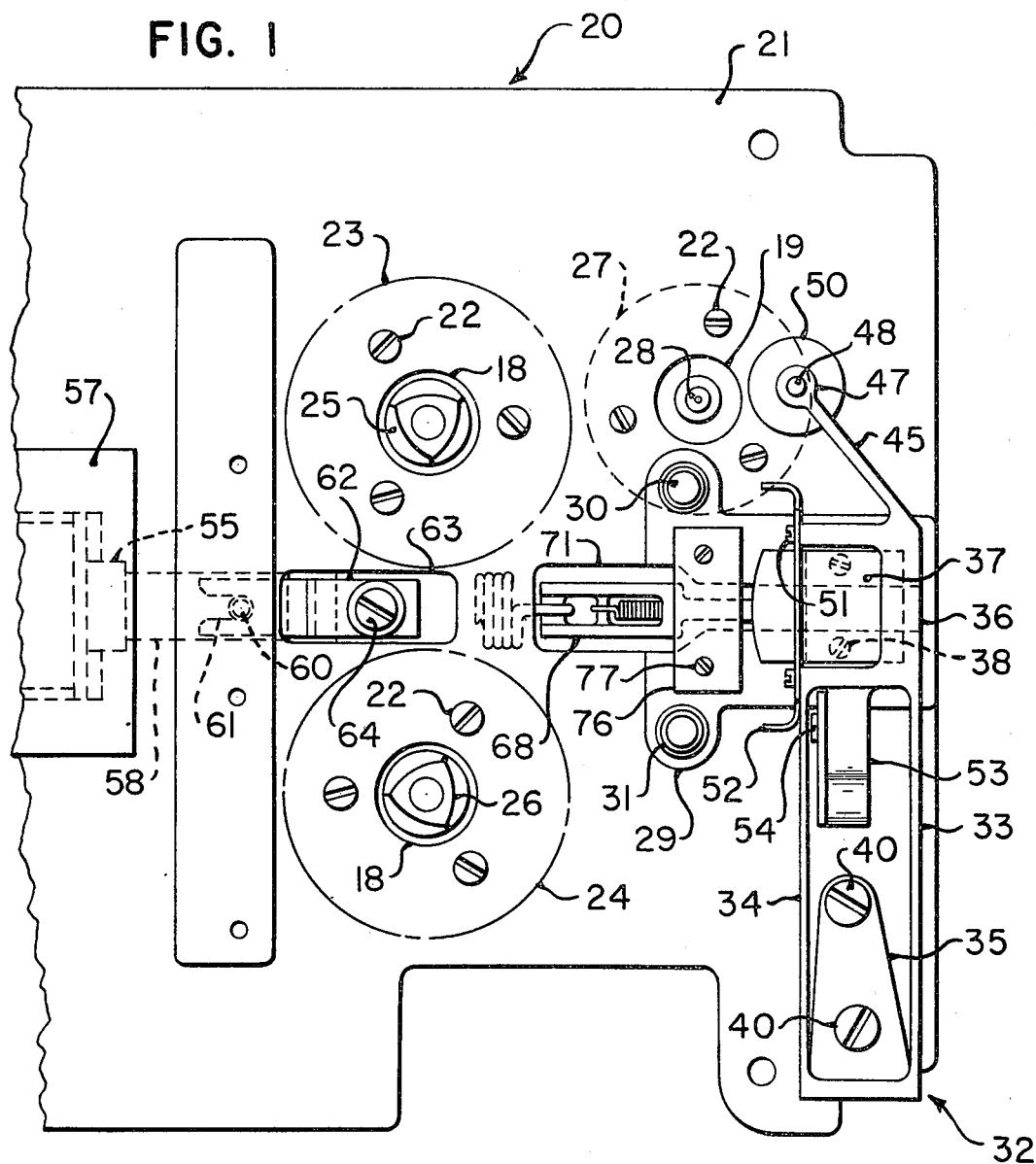
FIG. 1 is a top view of a portion of the tape deck showing the support structure for the transducer head and the pinch roller in the home position together with the location of the capstan drive member and the take-up and drive spindles.

Referring now to FIG. 1, there is shown a portion of a cassette tape transport deck designated generally by reference number 20 and which includes a deck plate 21 to the underside of which is mounted by any suitable fastening means, such as screws 22 or the like, take-up 23 and drive 24 motors with their attending take-up spindle 25 and drive spindle 26, respectively, projecting through apertures 18 located in the deck plate 21. Also secured to the underside of the deck plate 21 by means of screws 22 is a capstan drive motor 27 with its associated drive member 28 (FIGS. 1 and 4) extending through an aperture 19 in the deck plate 21.

Figure 4:
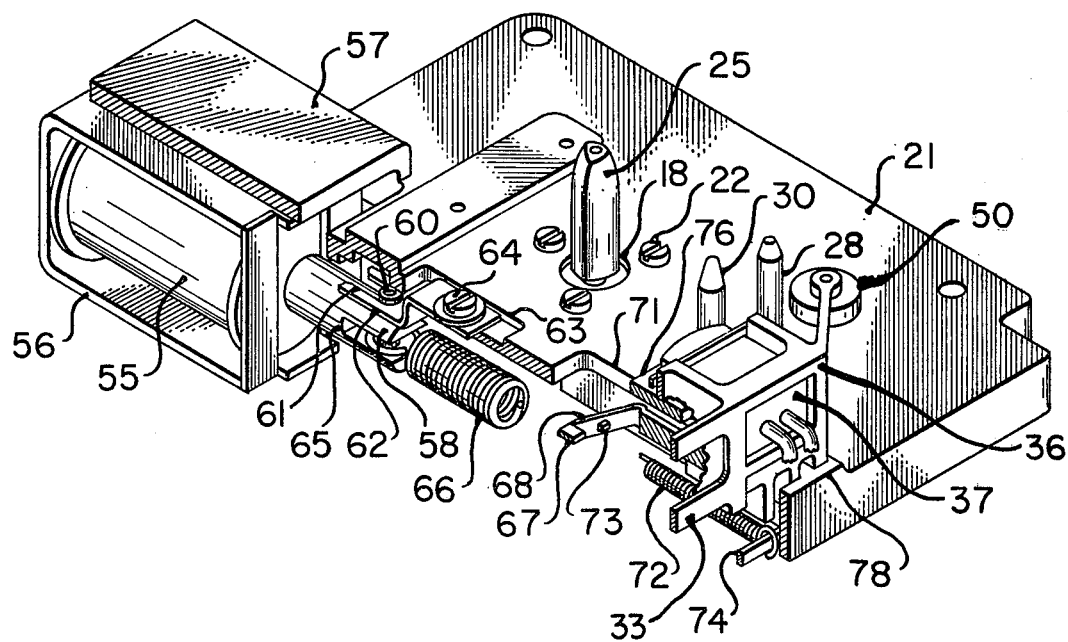
FIG. 4 is an oblique view of the tape deck of FIG. 1 with a portion removed to show details of the actuating mechanism for moving the free end of the support structure.

As further shown in FIGS. 1 and 4, extending from an upraised portion 29 of the deck plate 21 is a pair of guide pins 30, 31 for locating the cassette on the deck plate in a manner that is well known in the art.

Figure 2:
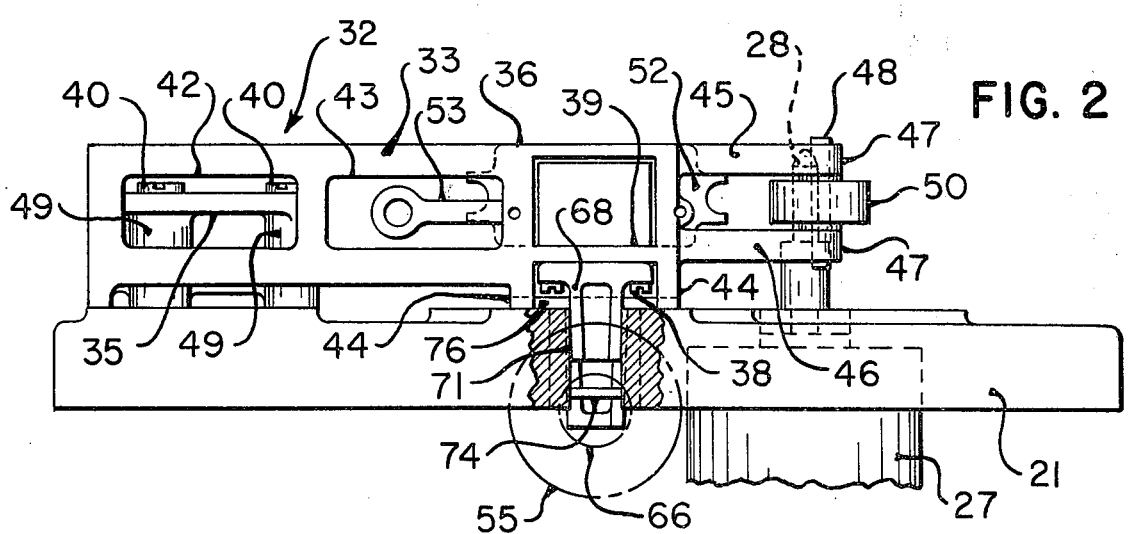
FIG. 2 is a side elevational view of the tape deck of FIG. 1 with a portion of the tape deck removed to show details of the location of the spring support.

In accordance with this invention, there is positioned adjacent the front end of the transport deck 20, a one-piece support structure generally designated as 32 (FIG. 1) and which preferably includes a pair of elongated upstanding beam portions 33, 34 arranged in a spaced, parallel relationship and each extending from a mounting portion 35 and terminating in a box-like support portion 36. The support portion 36 includes a base 39 to which is mounted a transducer head 37 by any suitable fastening means, such as screws 38 (FIGS. 1 and 2). In this arrangement, the transducer head is secured to the base 39 by mounting the screws below the base as shown in FIG. 2. As will be described more fully hereinafter, the screws 38 also mount a spring guide 68 to the lower surface of the base 39. As viewed in FIG. 1, it will be obvious that the support structure 32 is in the form of a pantograph.

As shown more clearly in FIG. 2, the mounting portion 35 of the structure 32 includes a pair of raised bosses 49 in which are mounted screws 40 for securing the mounting portion 35 to the deck plate 21. As also shown in FIG. 2, the beam portions 33, 34 contain a pair of cutout areas 42, 43 which allows the beam portions to flex more readily for reasons to be disclosed hereinafter.

Referring again to FIG. 2, it is seen that the box-like support portion 36 of the structure 32 includes a pair of depending legs 44 which rest on the deck plate 21 and ride thereon during movement of the support structure 32. Extending outwardly from the rear of the box-like portion 36 in a direction towards the capstan drive member 28 (FIGS. 1 and 2) are a pair of co-planar arms 45, 46 terminating in a hub-like portion 47 within which is rotatably mounted by any suitable means a shaft 48. A pinch roller 50 rotatably mounted on the shaft 48 and constructed in a conventional manner is located adjacent the capstan drive member 28. As will be described more fully hereinafter, movement of the support structure 32 in a direction to engage the transducer head with the magnetic tape will result in the pinch roller 50 coacting with the capstan drive member 28 to drive the magnetic tape positioned therebetween in a manner well known in the art.

As shown in FIGS. 1 and 2, secured to the front surface of the box-like portion 36 by means of screws 51 is a tape guide 52 which positions the magnetic tape with respect to the transducer head 37. Extending inwardly from the box-like portion 36 is a support extension 53, to the front surface of which is mounted an end of tape/beginning of tape sensor 54. As seen from FIG. 1, the sensor 54 is aligned with the locating pin 31 within which pin 31 is located a light source (not shown) and which source is positioned in the same horizontal plane as the sensor 54 and the magnetic tape. In a manner that is well known in the art, the sensor 54 generates signals indicating the presence or absence of the magnetic tape adjacent the sensor depending on whether the sensor receives light from the light source.

In accordance with this invention, the support structure 32 is fabricated from a single piece of plastic material which allows the free end of the structure 32 to flex when moved in a direction towards the magnetic tape. An example of the type of plastic material that may be used to practice the invention is acetal resin, which is commercially available under the name of Delrin, a registered Trademark of the E. I. DuPont du Nemours Co. This material has the characteristic of being machinable to provide the elements of the structure 32 while remaining flexible to provide the pantographic movement of the transducer head 37.

Associated with the support structure 32 is a mechanism for actuating the free end of the support structure 32, which mechanism includes a solenoid 55 (FIGS. 1 and 4) secured by any suitable means to a bracket 56 mounted to the rear underside of a raised portion 57 of the deck plate 21. The plunger 58 of the solenoid 55 supports a raised pin member 60 which is slidably positioned within a slot 61 of a Z shaped bracket 62, which bracket 62 in turn is mounted within a recessed portion 63 of the deck plate 21 by any suitable means such as screw 64.

Referring to FIG. 4, it will be seen that the plunger 58 has a bifurcated end portion 65 through which extends the pin 60. Secured to the pin 60 within the plunger end portion 65 is one end of a spring 66, the other end of which is secured to the end portion 67 of a spring support 68 (see also FIG. 1). As shown in FIG. 2, the spring support 68 is secured to the underside of the base 39 of the box-like portion 36 of support structure 32 by means of the screws 38 which, as was described previously, also secures the transducer head 37 to the base 39. The spring support 68 is slidably mounted within a slot 71 (FIGS. 1 and 2) which extends in a front-to-back direction in the deck plate 21. With such arrangement, it is seen that the spring support 68 will act to guide the movement of the transducer head 37 and the box-like portion 36 along the slot 71. A spring 72 (FIGS. 3 and 4) mounted between a web portion 73 of the spring support 68 and a cross member 74 located at the rear edge of the slot 71 functions to return the spring support 68 and the box-like portion 36 of the support structure 32 to the home position as shown in FIG. 1 upon deenergizing of the solenoid 55.

The spring support 68, in addition to engaging the solenoid spring 66, also acts as an anti-twist device to prevent any undesirable deflection or mis-alignment of the transducer head 37 during movement of the head to an engaging position with the magnetic tape. This is accomplished by locating the attachment point of the spring 66 to the support 68 in a horizontal plane which is below the top surface of the deck plate 21 upon which its support structure 32 rides. In addition to the location of such spring connection, the top of the spring support 68 is positioned adjacent the underside of a stop member 76 mounted by any suitable means, such as screw 77 (FIGS. 1 and 3) to the upraised portion 29 of the deck plate 21. Any twisting of the spring support 68 under urgence of the spring 66 will be resisted by the engagement of the top of the spring support 68 with the stop member 76. While the spring support 68 is shown in FIG. 4 as being mounted to the base 39 of support structure 32 by means of screws 38, it is obvious that the spring support 68 can itself be fabricated as part of the support structure 32.

In operation, it will be apparent that upon energizing of the solenoid 55, the plunger 58 will move to the left as viewed in FIGS. 1 and 4 resulting in the beam portions 33, 34 of the support structure 32 flexing to provide a pantographic movement of the free end 36 along a direction parallel to the direction of the slot 71. This movement will move the transducer head 37 into engagement with the magnetic tape or other record medium 75 (FIG. 4) together with the pinch roller 50, the arms 45, 46 flexing (FIG. 3) to provide a force on the capstan drive member 28 through the pinch roller 50. Since the arms 45, 46 are flexible and are capable of moving independently around an axis perpendicular to shaft 28, any misalignment between the rolling surface of the pinch roller 50 and the capstan drive member 28 due to the deflection of the member 28 by the pinch roller 50 or uneven wearing of the rolling surface will be automatically corrected due to the uneven forces acting on the arms 45, 46 resulting in the rotation of the rollers about a horizontal axis so as to maintain the roller shaft 48 in a parallel alignment with the capstan drive member 28.

Figure 3:
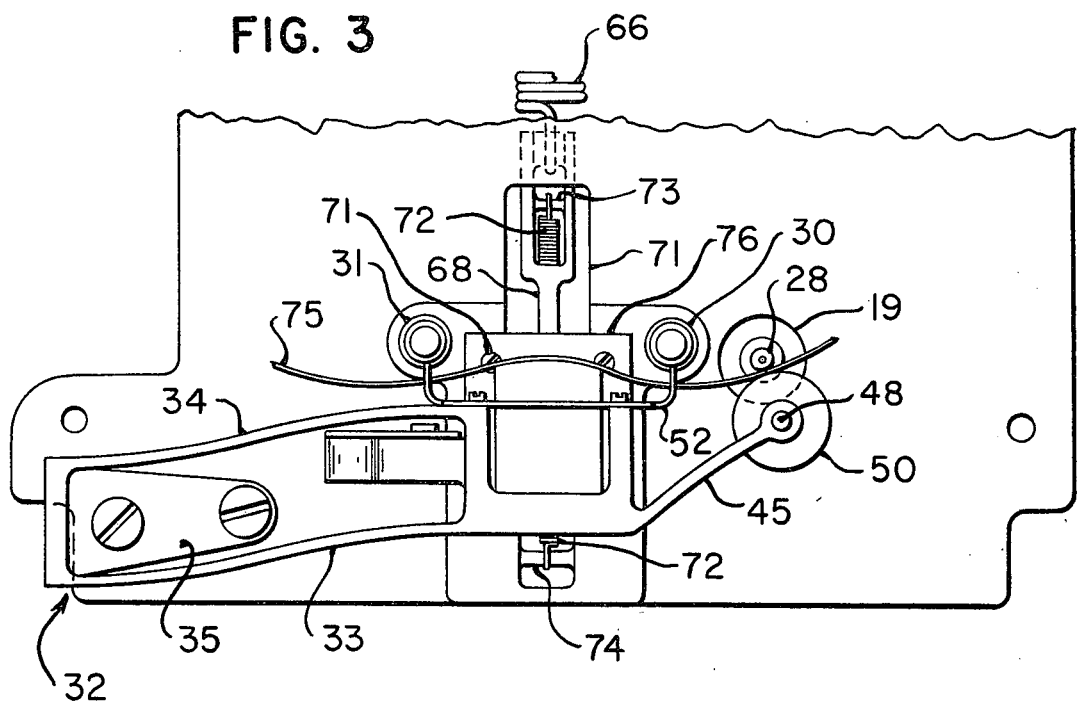
FIG. 3 is a view similar to FIG. 1 showing the support structure in a flexed position where the transducer head and the capstan roller are engaging the magnetic tape.

Movement of the transducer head 37 in an engaging direction, through selected energization of the solenoid 55, is limited by the stop 76 which will intercept the front of the legs 44 of the support structure 32 as the transducer head 37 is moved towards an engaging position with the tape 75 (FIG. 3). Solenoid spring 66 will of course be overcome at such time and permit continued movement of the plunger 58 within solenoid 55. Upon deenergization of the solenoid 55, the spring 72 will return the free end of the support structure 32 to its home position, this position being controlled by the rear edge 78 (FIG. 4) of the deck plate 21 adjacent the slot 71.

It is obvious that by fabricating the beam portions 33, 34 out of a plastic material which allows such beam portions to flex to provide a pantographic movement of the box-like portion 36, the transducer head 37 will always remain orientated in a direction which is perpendicular to the magnetic tape during its engaging movement. In addition, the use of plastic provides the support structure 32 with a high degree of repeatable alignment accuracy while being of low-cost construction.

While the principles of the invention have now been made clear in an illustrated embodiment, it will be obvious to those skilled in the art that many modifications of structure, arrangements, elements and components can be made which are particularly adapted for specific environments and operating requirements without departing from these principles. Thus, it is obvious that while the pinch roller support arms 44, 45 are disclosed as being fabricated as part of the support structure, the arms can be rotatably secured to the support structure with means for biasing the arms towards the capstan drive member to provide the required pressure on the pinch roller when engaged with the capstan drive member. It is also obvious that the spring support 68 coacting with the slot 71 can guide the transducer head in a direction perpendicular to the record medium thus allowing the actuating mechanism to engage the support structure 32 other than at the free end to accomplish the claimed result. Thus, the appended claims are therefore intended to cover any such modification, within the limits only of the true spirit and scope of the invention.

What is claimed is:

1. In combination, means for moving a transducer head from an inoperative position away from a record medium to an operative position engaging the record medium including
    a. a stationary support means position adjacent the record medium;
    b. an elongated flexible support means having one end secured to said stationary support means;
    c. transducer head means secured to the free end of said flexible support means;
    d. and actuating means engaging the free end of said flexible support means to move the free end of the flexible support means in a direction perpendicular to the record medium when operated whereby the flexible support means will flex in a direction to move the transducer head means in a direction perpendicular to the record medium to a position engaging the record medium.

2. The moving means of claim 1 in which said flexible support means includes a support member secured to said stationary support means, spaced apart flexible members secured at one end to said support member, and said transducer head means includes a transducer head support means secured to the free ends of said flexible members, said support member, said flexible members and said transducer head support means forming a pantograph for maintaining the movement of the transducer head means in a direction perpendicular to the record medium.

3. The moving means of claim 2 in which each of said flexible members comprises a flat surface extending upwardly in a plane parallel to the plane of movement of the record medium, said flat surface flexing in a direction perpendicular to the plane of the record medium upon operation of said actuating means to move the transducer head support means in a linear direction towards the record medium.

4. The moving means of claim 2 in which said flexible members and said transducer head support means comprise a single piece of material.

5. The moving means of claim 4 wherein the single piece of material is a plastic material having the flexibility to maintain the transducer head support means moving in a linear direction towards the record medium.

6. The moving means of claim 2 which further includes a pinch roller and support means secured to said transducer head support means for rotatably supporting the pinch roller, said pinch roller being moved in a linear direction to engage the record medium upon operation of the actuating means.

7. The moving means of claim 6 which further includes an extension secured to said transducer head support means and extending in a direction parallel to and aligned with the record medium and a sensing means mounted on said extension for generating electrical control signals upon sensing the presence or absence of the record medium.

8. An apparatus for moving a transducer head from an inoperative position away from a record medium to an operative position engaging a record medium, including:
    a. a supporting surface;
    b. anchor means secured to said supporting surface;
    c. a pair of spaced apart parallel flexible support members extending in a direction parallel to the record medium, said support members secured at one end to said anchor means;
    d. transducer head support means secured to the free ends of said support members, the support means, the support members and the anchor means forming a pantograph for moving the transducer head support means in a direction perpendicular to the record medium during flexing of said support members;
    e. a transducer head secured to said support means;
    f. means engaging said support means for moving the transducer head to an inoperative position away from the record medium;
    g. and selectively operating actuating means engaging the free end of said support means for moving the transducer head in a direction perpendicular to the record medium to a position engaging the record medium when operated.

9. The apparatus of claim 8 in which said support members and said support means comprise a single piece of material.

10. The apparatus of claim 9 in which said material comprises a plastic material having the flexibility to maintain the transducer head perpendicular to the record medium during the flexing of the support members.

11. The apparatus of claim 8 which further includes a pair of flexible arm members extending outwardly from said transducer head support means, said arm members rotatably supporting a pinch roller mounted therebetween for movement into engagement with the record medium upon operation of said actuating means.

12. The apparatus of claim 8 which further includes a support extension projecting outwardly from said transducer head support means in a direction aligned with the face of the record medium, said support extension supporting a sensing means for generating electrical control signals upon sensing the presence or absence of the record medium, said support extension moving in a direction perpendicular to the record medium upon operation of said actuating means whereby the sensor will be in a sensing position during movement of said transducer head support means.

13. In combination, a magnetic tape head positioning member for use in a tape transport assembly including a base for rotatably supporting a pair of reels with tape extending therebetween and a rotating capstan drive member mounted on the base and engaging one side of the tape for driving the tape between the reels, said head positioning member including:
   a. a stationary support member secured to said base;
   b. a plurality of spaced apart upstanding flexible members secured to said stationary support member at one end for movement in a direction perpendicular to the face of the tape;
   c. a support member engaging the free end of each of said beam members and supported therebetween for supporting a magnetic tape head, said beam members, said stationary support member and said tape head support member forming a pantograph for maintaining the magnetic tape head in a linear direction when moved towards the tape;
   d. a magnetic tape head secured to said support member;
   e. and actuating means mounted on said base and engaging said magnetic tape head support member for moving, upon operation, said tape head support member and the magnetic tape head in a linear direction from an inoperative position away from the magnetic tape towards the magnetic tape to an operative position where the magnetic tape head is in engagement with the magnetic tape.

14. The combination of claim 13 in which said beam members and said support members comprise a single piece of material.

15. The combination of claim 14 in which the single piece of material is a plastic material having the flexibility to maintain the magnetic tape head moving in a linear direction when moved by said actuating means.

16. The combination of claim 14 in which each of said beam members comprises a flat plate extending in a vertical direction from the base and in a plane parallel with the face of the magnetic tape, said plates positioned in a side-to-side relationship and having apertures thereon forming elongated members each of which engage and support said magnetic tape head support member, said stationary support member comprises a cross member engaging the plates opposite said support member, said cross member secured to said base, said cross member together with said plates and said support member comprises a pantograph to maintain the magnetic tape head perpendicular to the tape when moved toward the tape by operation of said actuating means.

17. The combination of claim 16 in which said magnetic tape head positioning member includes a pair of flexible arm members extending outwardly from said support members, said arm members rotatably supporting a pinch roller mounted therebetween for movement into engagement with the magnetic tape and the capstan drive member upon operation of said actuating means.

18. In a tape transport assembly including a base for rotatably supporting a pair of reels with a record tape extending therebetween and a rotating capstan mounted on the base and engaging one side of the record tape for driving the record tape between the reels, a record tape head positioning member including:
   a. a support structure comprising a support portion secured to the base;
   b. a pair of parallel spaced apart flexible beam portions secured to said support portion and extending in a direction parallel to the record tape, said beam portions flexing in a direction towards the record tape;
   c. a mounting portion secured to and positioned between the free ends of said beam portions, said mounting portion, beam portions and support portions comprising a pantograph for maintaining the mounting portion perpendicular to the record tape upon movement of the free ends of the beam portions;
   d. a record tape head secured to said mounting portion;
   e. and actuating means engaging said mounting portion for moving the mounting portion and the tape head from an inoperative position away from the record tape towards the record tape whereby the beam portions will flex to maintain the record tape head perpendicular to the record tape during movement of the mounting portion to an operative position wherein the tape head will engage the record tape.

19. The tape transport of claim 18 in which the tape head positioning member comprise a single piece of material.

20. The tape transport of claim 19 in which the material is a plastic material having a flexibility to maintain the mounting portion of the tape head positioning member moving in a direction perpendicular to the record tape when actuated.

21. The tape transport of claim 18 wherein said base has a slot extending in a direction generally perpendicular to the record tape, said actuating means includes:
   a. a connecting member extending from said mounting portion and within said slot of the base;
   b. and selectively operating drive means secured to said base and engaging said connecting member for moving said mounting portion along said slot and towards the record tape when operated.

22. The tape transport of claim 21 in which said drive means include a first resilient member engaging said connecting member and an energizing drive member engaging said resilient member whereby said connecting member is moved in a direction perpendicular to the record tape upon energizing of said drive member.

23. The tape transport of claim 22 which further includes a second resilient member mounted between said connecting member and the base for returning said connecting member to its home position upon deenergizing of said drive member.

24. The tape transport of claim 18 which further includes a pair of co-planar flexible arm members extending outwardly from said mounting portion, said arm members rotatably supporting a pinch roller mounted therebetween for positioning said roller into engagement with the record tape adjacent the capstan upon operation of said actuating means.

25. The tape transport of claim 24 which further includes a support extension secured to said mounting portion opposite to said arm member and extending in a direction parallel to and co-planar with the record tape and a sensor member mounted on said extension for generating electrical control signals upon sensing the presence or absence of the record tape.

* * * * *